United States Patent
Syed et al.

(10) Patent No.: US 9,496,751 B2
(45) Date of Patent: Nov. 15, 2016

(54) VEHICLE POWER SYSTEM

(75) Inventors: Fazal Urrahman Syed, Canton, MI (US); Venkatapathi Raju Nallapa, West Bloomfield, MI (US); Shailesh Shrikant Kozarekar, Novi, MI (US); Michael Edward Loftus, Northville, MI (US); Shane Schulze, Ypsilanti, MI (US); Robert K. Taenaka, Plymouth, MI (US); Donald Charles Franks, Linden, MI (US); Ming Lang Kuang, Canton, MI (US); Venkateswa Anand Sankaran, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 691 days.

(21) Appl. No.: 12/817,703

(22) Filed: Jun. 17, 2010

(65) Prior Publication Data

US 2011/0163710 A1  Jul. 7, 2011

(51) Int. Cl.
*H02J 7/00* (2006.01)
*H01M 10/44* (2006.01)
*H01M 10/46* (2006.01)
*H02J 7/35* (2006.01)
*B60K 16/00* (2006.01)
*B60L 11/18* (2006.01)
*B60L 8/00* (2006.01)
*B60K 6/20* (2007.10)

(52) U.S. Cl.
CPC ............... *H02J 7/35* (2013.01); *B60K 16/00* (2013.01); *B60L 8/003* (2013.01); *B60L 11/1809* (2013.01); *B60K 6/20* (2013.01); *B60K 2016/003* (2013.01); *Y02T 10/6269* (2013.01); *Y02T 10/7005* (2013.01); *Y02T 10/7072* (2013.01); *Y02T 10/7083* (2013.01); *Y02T 10/90* (2013.01); *Y02T 90/14* (2013.01)

(58) Field of Classification Search
USPC .......... 320/101, 103, 104, 105; 180/2.1, 2.2
See application file for complete search history.

(56) References Cited

U.S. PATENT DOCUMENTS

| 4,090,577 | A |   | 5/1978  | Moore |
|-----------|---|---|---------|-------|
| 4,141,425 | A |   | 2/1979  | Treat |
| 4,592,436 | A |   | 6/1986  | Tomei |
| 5,353,006 | A | * | 10/1994 | Aguilar .................... 340/426.36 |
| 5,669,987 | A | * | 9/1997  | Takehara et al. ............. 136/244 |
| 6,917,298 | B2 | * | 7/2005 | Romano et al. ........... 340/636.1 |

(Continued)

FOREIGN PATENT DOCUMENTS

| CN | 2905540 Y | 5/2007 |
| DE | 4128297 C1 | 12/1992 |

(Continued)

OTHER PUBLICATIONS

MultiPower—Use many power sources for cars, printed Jun. 3, 2010 from www.halfbakery.com/idea/MultiPower.

(Continued)

*Primary Examiner* — Samuel Berhanu
(74) *Attorney, Agent, or Firm* — David B. Kelley; Brooks Kushman P.C.

(57) ABSTRACT

A vehicle may include an electric machine, a traction battery, and a solar panel array. The vehicle may further include circuitry electrically connected with the battery and array. The circuitry may include at least one switch configured to close when activated by a calibrated maximum holding power to permit energy to flow from the array to the battery.

14 Claims, 2 Drawing Sheets

(56) References Cited

U.S. PATENT DOCUMENTS

| | | | |
|---|---|---|---|
| 2004/0228053 A1* | 11/2004 | Thiery et al. | 361/84 |
| 2006/0213697 A1 | 9/2006 | Sutherland | |
| 2007/0013340 A1* | 1/2007 | Mattichak | 320/101 |
| 2007/0125417 A1 | 6/2007 | Johanson et al. | |
| 2007/0261896 A1 | 11/2007 | Shaffer et al. | |
| 2008/0110485 A1 | 5/2008 | Vasilantone | |
| 2008/0143292 A1* | 6/2008 | Ward | 320/101 |
| 2008/0166637 A1 | 7/2008 | Inagaki et al. | |
| 2008/0236648 A1* | 10/2008 | Klein et al. | 136/244 |
| 2009/0001926 A1* | 1/2009 | Sato | 320/102 |
| 2009/0314556 A1 | 12/2009 | Harris | |
| 2010/0127568 A1* | 5/2010 | Ng | 307/32 |
| 2010/0170727 A1 | 7/2010 | Hsu et al. | |

FOREIGN PATENT DOCUMENTS

| | | |
|---|---|---|
| FR | 2768972 A1 | 4/1999 |
| JP | 2007228753 A | 9/2007 |
| WO | 2006095210 A1 | 9/2006 |
| WO | 2007025096 A1 | 1/2007 |
| WO | 2007085239 A1 | 8/2007 |
| WO | 2007096720 A1 | 8/2007 |

OTHER PUBLICATIONS

W, Gerdes, Plug-in-Hybrid-Electric Vehicle or PHEV's are yet another possible answer, Mar. 6, 2006, printed from www.cleanmpg.com/forums/showthread.php?T=196.

"Solar Car Butt", printed Jun. 3, 2010 from www,halfbakery.com/idea/Solar_20Car_20Butt.

Solar Energy Kit Gives Prius 10% Better Mileage, Dec. 9, 2005, printed from www.renewableenergyworld.com/re/news/article/2005/12.

C. Neil, Solar Hybrid Vehicles, May 22, 2006, printed from www.energypulse.net/centers/article/article_display.cfm?a_id=1267.

"Solar Skin Electric Car, A Car with a flexible solar panel skin", printed Jun. 3, 2010 from www.halfbakery.com/idea/Solar_20Skin_20Electric_20Car.

J. Thomas, Using Solar Roofs to Power Hybrids, May 31, 2007, printed from treehugger.com/files/2007/05/solar_hybrid_ca.php.

D. Birnie, III, Solar-to-vehicle (S2V) systems for powering commuters of the future, Journal of Power Sources 186 (2009) 539-542.

"Photovoltaic tonneau cover to charge auxiliary car batteries", printed Jun. 3, 2010 from www.halfbakery.com/idea/Photovoltaic_20tonneau_20cover.

* cited by examiner

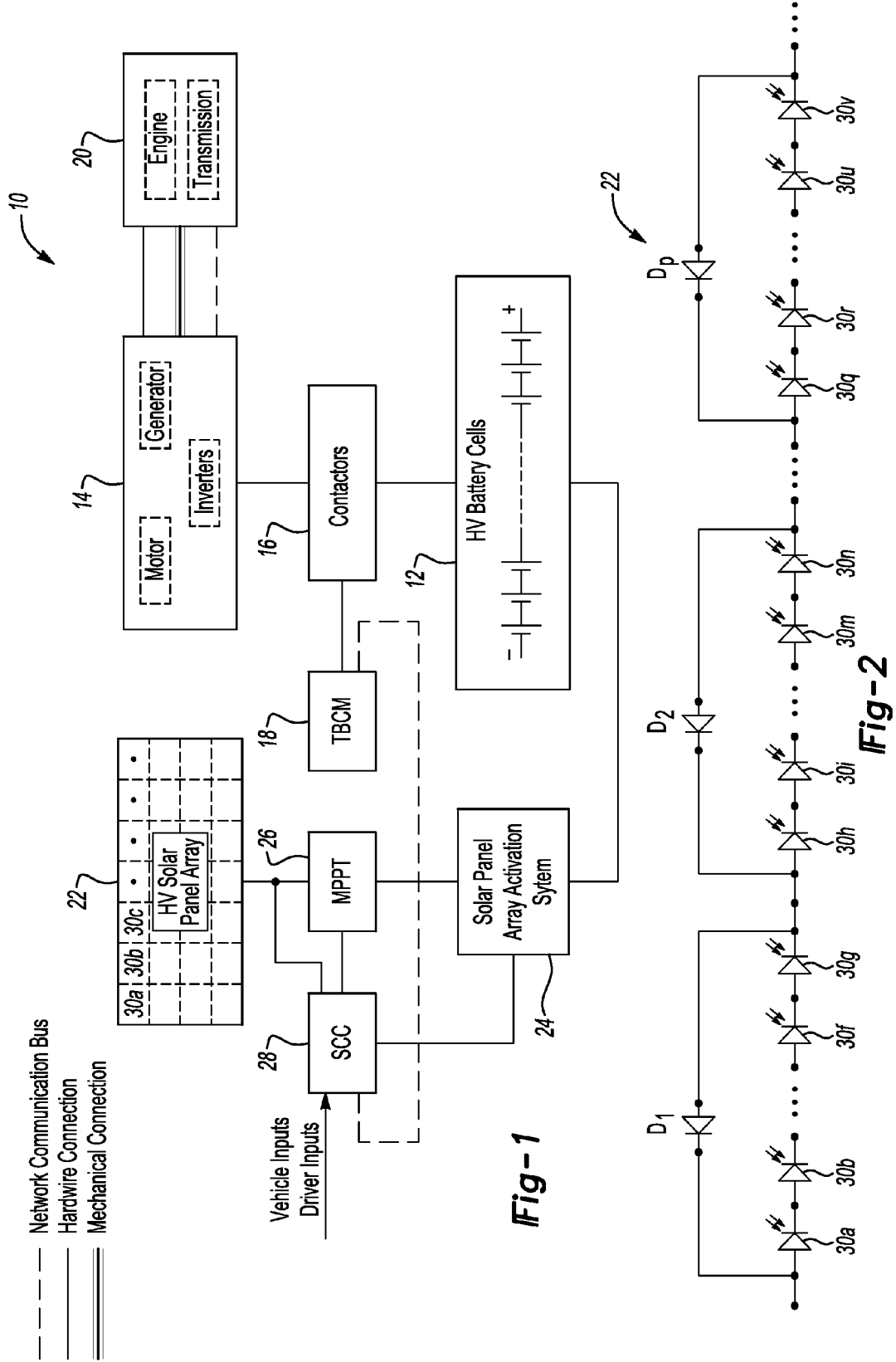

VEHICLE POWER SYSTEM

BACKGROUND

Alternatively powered vehicles such as hybrid electric vehicles, plug-in hybrid electric vehicles and battery electric vehicles may use an electric machine to convert energy stored in a high-voltage battery to motive power. For hybrid electric vehicles, the high-voltage battery may store energy converted by an internal combustion engine or captured from regenerative braking events. The high-voltage battery of plug-in hybrid electric vehicles may additionally store energy received from a utility grid. Likewise, the high-voltage battery of battery electric vehicles may store energy received from a utility grid.

Certain of the above energy sources may have a cost associated with them. An internal combustion engine of a hybrid electric vehicle, for example, may burn gasoline to convert energy for storage by the high-voltage battery. This gasoline, of course, must be purchased. Utility grids likewise charge for the electric power they supply. The energy captured from regenerative braking events, in contrast, does not have such a direct cost. In a sense, it is free energy. It may thus be desirable to charge a high-voltage battery of an alternatively powered vehicle with energy that does not impose a direct cost on the driver.

SUMMARY

A power system for a vehicle may include a traction battery, an electric machine configured to convert electrical energy from the traction battery to mechanical energy to move the vehicle, and a plurality of switches configured to electrically connect the battery and machine when closed. The system may further include power source output terminals and another plurality of switches configured to electrically connect the battery and output terminals when closed. Other arrangements and configurations are also described herein.

BRIEF DESCRIPTION OF THE DRAWINGS

FIG. 1 is a block diagram of an embodiment of a power system of an alternatively powered vehicle.

FIG. 2 is a schematic diagram of the solar panel array of FIG. 1.

DETAILED DESCRIPTION

Figure 3:
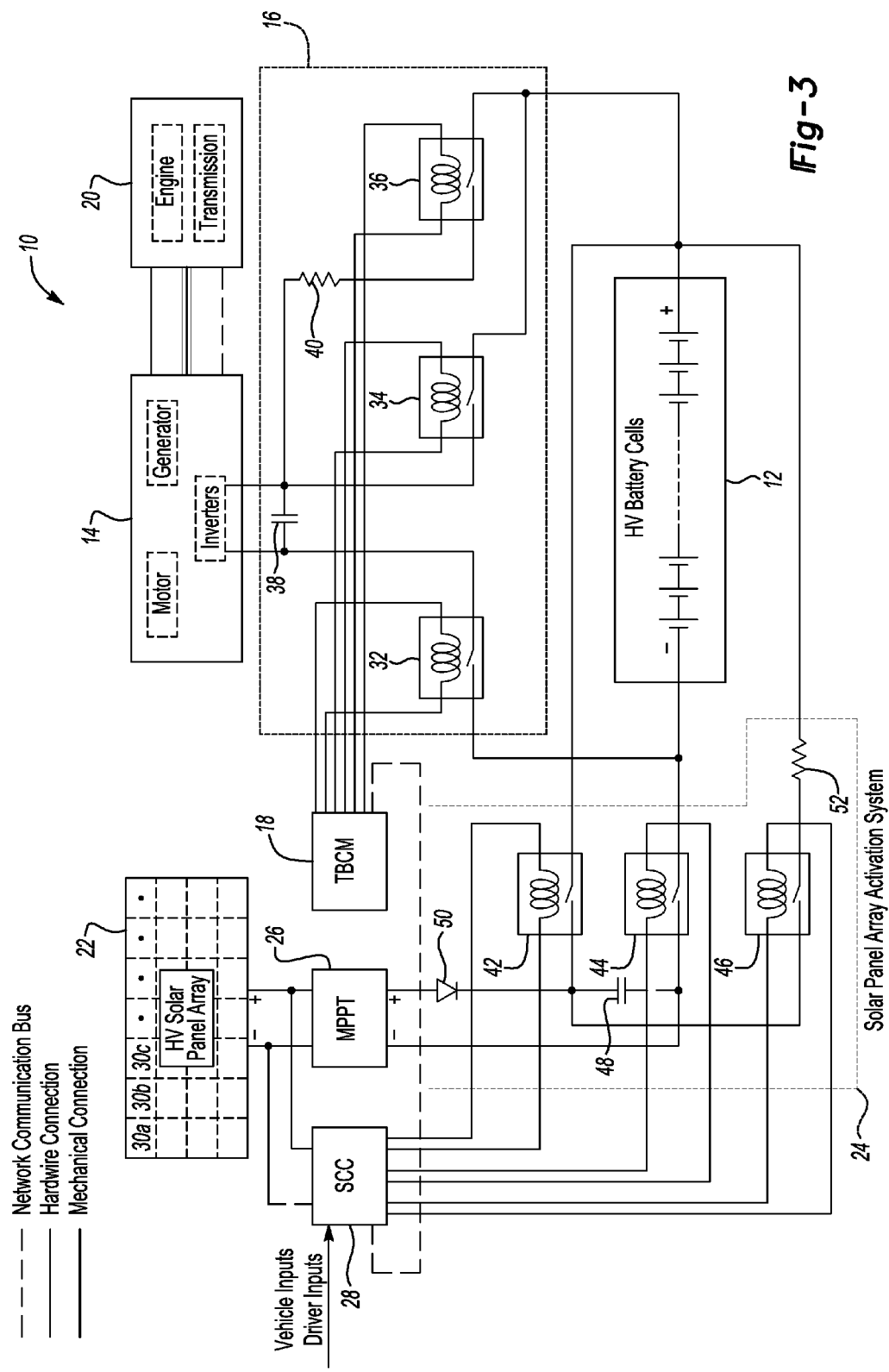
FIG. 3 is a schematic diagram of the power system of FIG. 1.

Solar energy may be captured via solar cells and used to charge a high-voltage battery of and alternatively powered vehicle. Typically, solar cells having a low voltage output are arranged in a strategic location on a vehicle's exterior. The solar cells are electrically connected with a DC/DC boost converter that boosts the voltage output by the solar cells to a level near that of the high-voltage battery to be charged. A high-voltage bus electrically connects the DC/DC boost converter and high-voltage battery.

DC/DC boost converters may be inefficient. Substantial portions of the energy captured via the solar cells may thus be lost as heat during the boosting process. Relatively speaking, solar cells may only capture small amounts of energy. Losses of this energy during the boosting process may make charging the high-voltage battery with solar energy impractical.

The electrical connection of a high-voltage battery of an alternatively powered vehicle and an electric machine may be facilitated by a set of contactors (main contactors). That is, these contactors may be closed to establish the electrical connection. Main contactors are typically sized to handle, relatively speaking, large amounts of current (e.g., 100+A).

Typically, solar cells of an alternatively powered vehicle are electrically connected with the vehicle's high-voltage battery via the main contactors. Because of the main contactors' size, a substantial amount of energy (e.g., 12 W holding/steady state, 240 W peak) may be required to close the main contactors relative to the amount of energy captured via the solar cells. So much so, that it may make charging the high-voltage battery with solar energy impractical.

Certain embodiments disclosed herein may provide a solar panel array that may be electrically connected with a high-voltage battery. The solar panel array's output voltage may be such that a DC/DC boost converter may not be needed to boost the solar panel array's output in order to trickle charge the high-voltage battery. As an example, an array may have an output voltage of at least 200 V at a standard solar irradiance of 1000 W/m$^2$. Hence, less energy may be lost as heat in such configurations relative to those including a DC/DC boost converter.

Certain embodiments disclosed herein may provide an electrical infrastructure to electrically connect a solar panel array with a high-voltage battery. This electrical infrastructure may require less energy to establish the electrical connection between the array and battery as compared with arrangements where main contactors are closed to establish the connection. A separate (smaller) set of switches/contactors/relays, as an example, may be closed to electrically connect the array and battery. More energy, as a result, may be used to charge the battery.

Referring to FIG. 1, an alternatively powered vehicle 10 may include a high voltage traction battery 12 (e.g., 200+V at 70% SOC), electric machine 14 (e.g., motor, generator, inventors, etc.), contactors 16 (main contactors), traction battery control module (TBCM) 18 and other powertrain components 20 (e.g., engine, transmission, etc.) The traction battery 12 and electric machine 14 are electrically connected with the contactors 16. When appropriately closed by the TBCM 18 as discussed below, the contactors 16 permit energy to flow between the traction battery 12 and electric machine 14.

The electric machine 14 and powertrain components 20 are mechanically connected. As such, the electric machine 14 may convert electrical energy from the traction battery 12 to mechanical energy for the powertrain components 20 and visa versa.

The vehicle 10 may further include a high voltage solar panel array 22, output terminals 23 (FIG. 3), solar panel array activation system 24, multiple power point tracker (MPPT) 26, and solar cell controller (SCC) 28. The solar panel array 22, MPPT 26 and SCC 28 are electrically connected with the output terminals 23. The SCC 28 may be a separate controller or integrated within a vehicle system controller, hybrid control module unit, or powertrain control module, etc. As discussed in more detail below, the activation system 24 and MPPT 26, under the control of the SCC 28, permit energy from the solar panel array 22 to charge the traction battery 12 without having to close any of the contactors 16. Of course, other arrangements are also possible.

In the embodiment of FIG. 1, the solar panel array 22 includes a plurality of relatively small (e.g., 50 mm×120 mm) solar cells 30n (30a, 30b, etc.) electrically connected in series. Each of the cells 30n has an effective $V_{cell}$ (e.g., of about 0.5 V at a standard solar irradiance of 1000 W/m2) and low current (e.g., 150 mA—note that current depends on cell area) output. The cells 30n are of sufficient number such that their collective output, at a standard solar irradiance of 1000 W/m2, is, for example, at least equal to the voltage of the traction battery 16 at 70% SOC (e.g., 200 V). This arrangement permits the solar panel array 22 to be directly electrically connected to the traction battery 12 (whether or not a MPPT is used).

The MPPT 26 of FIG. 1 may be used to operate the solar panel array 22 at its peak efficiency in any suitable known fashion. In the embodiment of FIG. 1 for example, the MPPT 26 is a high efficiency DC/DC buck converter that may extract maximum power from the solar panel array 22. Other suitable/known MPPT configurations, however, are also possible.

The number, n, of cells 30n may be determined based on the following equation $$n = \frac{N_{HVBatCells}(V_{HVBatCellOCV@HiSOC} + \Delta V_{HVBatCell@HiSOC})}{V_i} \quad (1)$$

where $N_{HVBatCells}$ is the number of battery cells in the traction battery 12, $V_{HVBatCellOCV@HiSOC}$ is the traction battery individual cell open circuit voltage at a high (or target) SOC (e.g., a SOC around 70% and an open circuit voltage at that SOC around 1.7 V), $\Delta V_{HVBatCellOCV@HiSOC}$ is the traction battery individual cell extra voltage rise when a low amount of charge current is passed through the individual battery cell, $V_i$ is the individual solar cell open circuit voltage at a standard solar irradiance of 1000 W/m², and i can be written as follows $$i=1,2,\ldots,k-1,k,k+1,\ldots,m-1,m,m+1,\ldots,n-1,n \quad (2)$$

(1) may be re-written as $$n = \frac{V_{HVBatOCV@HiSOC} + \Delta V_{HVBatOCV@HiSOC}}{V_i} \quad (3)$$

where $V_{HVBatCellOCV@HiSOC}$ is the traction battery open circuit voltage at a high (or target) SOC (e.g., a SOC around 70% and an open circuit voltage at that SOC around 270 V-assuming that all of the individual battery cells in the traction battery 12 are balanced and at the same SOC), and $\Delta V_{HVBatCellOCV@HiSOC}$ is the traction battery extra voltage rise when a low amount of charge current is passed through the traction battery 12. Any suitable relation and/or technique, however, may be used to determine the number, n, of cells 30n (or any other parameters herein).

Referring to FIG. 2, the solar panel array 22 includes n number of individual solar cells 30n connected in series to achieve a high voltage output. The output open circuit voltage of the solar panel array 22 is given by $$V_{s\_ocv} = \sum_{i=1}^{n} V_i \quad (4)$$

Assuming similar characteristics for each solar cell 30n, (4) can be re-written as $$V_{s\_ocv} = \sum_{i=1}^{n} V_i = nV_i \quad (5)$$

Substituting (3) into (5) results in $$V_{s\_ocv} = \sum_{i=1}^{n} V_i = nV_i = V_{HVBatOCV@HiSOC} + \Delta V_{HVBatOCV@HiSOC} \quad (6)$$

The solar panel array 22, in the embodiment of FIG. 2, also includes Schotky bypass diodes, $D_1, D_2, \ldots, D_p$, that may be placed every k solar cells to ensure that optimum power can be generated under, for example, cell shading conditions. Hence, cells whose current drops as a result of shading may be bypassed.

In order to achieve a desired maximum power output, $P_s$ of the solar panel array 22, the area of each of the individual solar cells 30n may be selected based on $P_s$. That is, $P_s$ of the solar panel array 22 may be used to determine the short circuit current of the solar panel array, $I_{SC}$, and the short circuit current of the individual cells, $I_i$. $I_i$ may then be used to determine the area of each of the individual solar cells 30n as given by $$I_{sc} = \frac{P_s}{V_{s\_ocv} - \Delta V_{s\_ocv}} \quad (7)$$

where $\Delta V_{S\_OCV}$ the voltage below which the current output of the solar panel array 22 is approximately constant or close to $I_{SC}$.

Because the individual solar cells 30n are connected in series, $I_{SC}$ is the same as $I_i$. Hence (7) can be re-written as follows for the individual solar cells 30n

$$I_i = I_{sc} = \frac{P_s}{V_{s\_ocv} - \Delta V_{s\_ocv}} = \frac{P_s/n}{(V_{s\_ocv} - \Delta V_{s\_ocv})/n} = \frac{P_i}{V_i = \Delta V_i} \quad (8)$$

By solving for $V_i$ from (6) and substituting into (8), we find that $$I_i = \frac{P_i}{\left(\frac{V_{HVBatOCV@HiSOC} + \Delta V_{HVBatOCV@HiSOC}}{n}\right) - \Delta V_i} \quad (9)$$

(9) is the desired individual solar cell short circuit current which is essentially proportional to the area of the individual solar cells 30n. (9) can therefore be used to determine the area of each of the individual solar cells 30n.

Referring to FIG. 3, the contactors 16 may include negative terminal main contactor 32 (electrically connected with the negative terminal of the traction battery 12), positive terminal main contactor 34 (electrically connected with the positive terminal of the traction battery 12), pre-charge contactor 36 (electrically connected between the positive terminal of the traction battery 12 and the inverters 14), main capacitor 38 (electrically connected across the positive and negative terminals of the traction battery 12), and pre-charge resistor 40 (electrically connected between the positive terminal of the traction battery 12 and the inverters 14). The contactors 32, 34, 36 are also electrically connected with/ under the control of the TBCM 18. Other arrangements are, of course, also possible. The pre-charge contactor 36 may instead, for example, be electrically connected between the negative terminal of the traction battery 12 and the inverters 14, etc.

To electrically connect the traction battery 12 with the electric machine 14, the TBCM 18 first closes the negative terminal main contactor 32 and the pre-charge contactor 36 to charge the main capacitor 38 through the pre-charge resistor 40. Once the main capacitor 38 is charged, the TBCM 18 closes the positive terminal contactor 34 and opens the pre-charge contactor 36. As discussed above (and below), a significant amount of energy may be required to close the contactors 32, 34, 36.

The solar panel activation system 24, in the embodiment of FIG. 3, may include positive terminal switch/contactor/ relay 42 (electrically connected with the positive terminal of the traction battery 12), negative terminal switch/contactor/ relay 44 (electrically connected with the negative terminal of the traction battery 12), pre-charge switch/contactor/relay 46 (electrically connected with the positive terminal of the traction battery 12 and the MPPT 26), capacitor 48, diode 50, and resistor 52 (electrically connected between the positive terminal of the traction battery 12 and the pre-charge contactor 46). The relays 42, 44, 46 are also electrically connected with/under the control of the SCC 28. The capacitor 48 is electrically connected between the relays 42, 44 and therefore may be used for filtering noise spikes. The diode 50 is electrically connected such that current only flows from the solar panel array 22 to the traction battery 12.

The solar panel activation system 24, in other embodiments, may comprise a single switch. For example, one of the negative and positive terminals of the traction battery 12 may always be connected with the solar panel array 22. The other of the negative and positive terminals of the traction battery 12 may be connected with the solar panel array 22 via a switch. Other arrangements and configurations including additional switches, capacitors and/or diodes, and/or lacking capacitors and/or diodes are also possible.

The relays 42, 44, 46 may be sized smaller than the contactors 32, 34, 36 as they handle less current. For example, the relays 42, 44, 46 may handle current on the order of 0.035 A to 1 A (up to 5 A for example) whereas the contactors 32, 34, 36 may handle current on the order of 150 A. As a result, approximately 10 mA to 25 mA of current (or 0.12 W to 0.3 W of power (up to 1 W holding power for example)) may be needed to close the relays 42, 44, 46 whereas 250 mA to 1 A (peak 10 A to 20 A) of current (or 3 W to 12 W (120 W to 240 W peak power)) may be needed to close the contactors 32, 34, 36. Such a difference in energy consumption may be significant given that the solar panel array 22 may only collect energy in the range of 5 W to 200 W.

To electrically connect the traction battery 12 with the solar panel array 22 (based on driver and/or vehicle inputs), the SCC 28 may first close the relays 44, 46 to soft charge the capacitor 38 through the resistor 52. Once the capacitor 38 is charged, the SCC 28 may then close the relay 42 and open the relay 44. To disconnect the traction battery 12 with the solar panel array 22, the SCC 28 may open the relays 42, 44. Other configurations of the solar panel activation system 24 may, of course, result in different strategies for electrically connecting the traction battery 12 with the solar panel array 22.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A vehicle comprising:
   an electric machine;
   a traction battery including positive and negative end terminals having a voltage of at least 200 volts thereacross at a particular state of charge and configured to provide energy to the electric machine;
   a solar panel array including a number of solar cells arranged to have an output voltage of at least 200 volts at a standard solar irradiance of 1,000 watts per meter, wherein the number is based on the voltage of the fraction battery at the particular state of charge and wherein an area of each of the cells is based on the number and a target maximum power for the cell; and
   first and second switches each having a maximum current carrying capability less than 5 Amps, wherein the first switch is electrically connected between the solar panel array and the positive end terminal and the second switch is electrically connected between the solar panel array and the negative end terminal such that the switches, when closed, electrically connect the solar panel array to the traction battery to trickle charge the traction battery without a boost converter.

2. The vehicle of claim 1 further comprising a resistor and a third switch electrically connected to (i) one of the positive and negative end terminals of the traction battery and (ii) the solar panel array through the resistor.

3. The vehicle of claim 1 further comprising a capacitor electrically connected to the first and second switches.

4. The vehicle of claim 1 further comprising a diode electrically connected between the solar panel array and one of the first and second switches.

5. The vehicle of claim 1, wherein the solar panel array includes output terminals, further comprising a capacitor electrically connected to the output terminals.

6. The vehicle of claim 1 further comprising a multiple power point tracker electrically connected to the solar panel array.

7. A vehicle comprising:
   an electric machine;
   a traction battery having a voltage of at least 200 volts at a particular state of charge and including a plurality of battery cells configured to provide energy to the electric machine;
   a solar panel array including a number of solar cells arranged to have an output voltage of at least 200 volts at a standard solar irradiance of 1,000 watts per meter, wherein the number is based on the voltage of the traction battery at the particular state of charge and wherein an area of each of the cells is based on the number and a target maximum power for the cell; and
   circuitry electrically connected with the traction battery and array, and including first and second switches each being configured to close when activated by no more than 1 watt maximum holding power to permit energy to flow from the solar panel array to the plurality of battery cells to trickle charge the traction battery without a boost converter.

8. The vehicle of claim 7, wherein the circuitry further includes a resistor and a third switch electrically connected to the traction battery and the solar panel array through the resistor.

9. The vehicle of claim 7, wherein the circuitry further includes a capacitor electrically connected to the first and second switches.

10. The vehicle of claim 7, wherein the circuitry further includes a diode electrically connected between the solar panel array and one of the first and second switches.

11. The vehicle of claim 7, wherein the solar panel array includes output terminals, further comprising a capacitor electrically connected to the output terminals.

12. The vehicle of claim 7 further comprising a multiple power point tracker electrically connected to the solar panel array.

13. A power system for a vehicle comprising:
a fraction battery including a plurality of battery cells and having a voltage of at least 200 volts at a particular state of charge;
an electric machine configured to convert electrical energy from the traction battery to mechanical energy to move the vehicle;
a plurality of switches configured to electrically connect the traction battery and electric machine when closed; power source output terminals;
a solar panel array including a number of solar cells arranged to have an output voltage of at least 200 volts at a standard solar irradiance of 1,000 watts per meter$^2$ electrically connected with the output terminals, wherein the number is based on the voltage of the traction battery at the particular state of charge and wherein an area of each of the cells is based on the number and a target maximum power for the cell; and
another plurality of switches configured to electrically connect the plurality of battery cells and output terminals when closed to trickle charge the traction battery without a boost converter, wherein at least one of the another plurality of switches has a maximum current carrying capability less than 5 Amps.

14. The system of claim 13, wherein at least one of the another plurality of switches is configured to close when activated by no more than 1 watt maximum holding power.

* * * * *